Sept. 7, 1954  C. R. HAGEN ET AL  2,688,223
IMPLEMENT MOUNTING FOR TRACTORS

Filed April 3, 1951  5 Sheets-Sheet 1

INVENTORS.
Clarence R. Hagen
Paul J. Hulseberg
BY Paul O. Pippel
Atty.

Sept. 7, 1954 C. R. HAGEN ET AL 2,688,223
IMPLEMENT MOUNTING FOR TRACTORS
Filed April 3, 1951 5 Sheets-Sheet 3
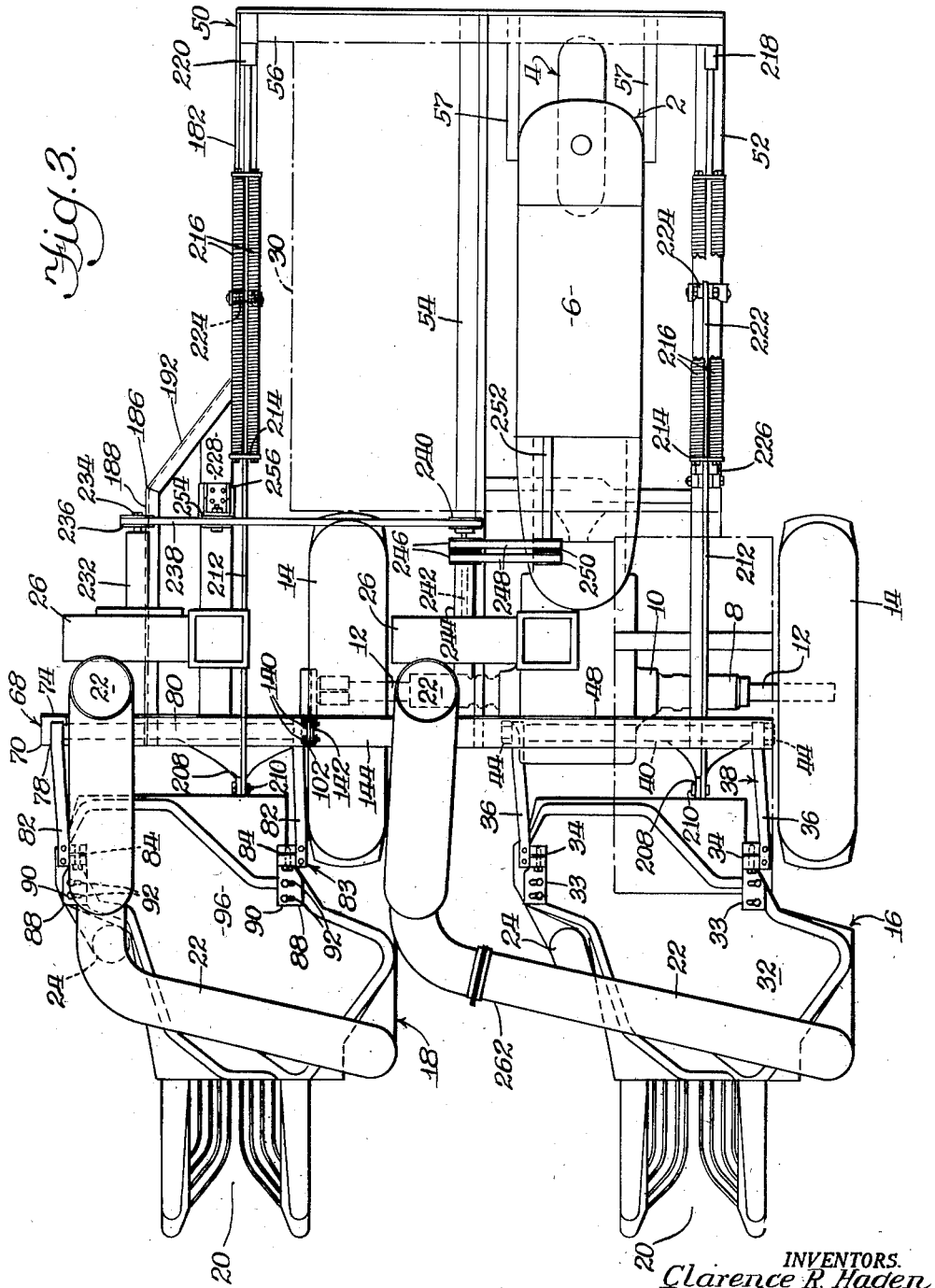
Fig. 3.
INVENTORS.
Clarence R. Hagen
Paul J. Hulseberg
BY
Atty.

Sept. 7, 1954  C. R. HAGEN ET AL  2,688,223
IMPLEMENT MOUNTING FOR TRACTORS
Filed April 3, 1951  5 Sheets-Sheet 4

INVENTORS
Clarence R. Hagen
Paul J. Hulseberg
BY Paul O. Pippel
Atty.

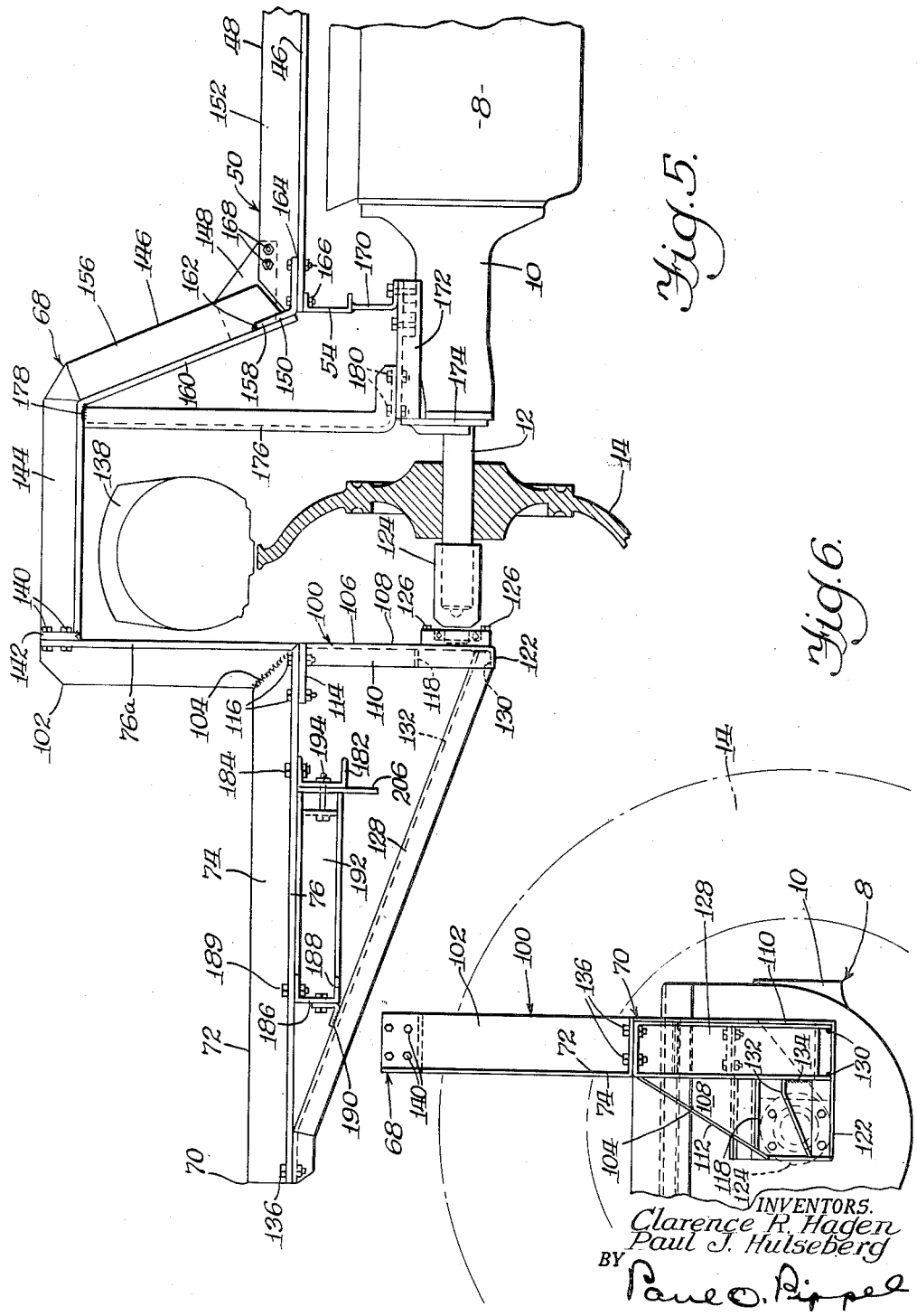

Patented Sept. 7, 1954

2,688,223

UNITED STATES PATENT OFFICE 2,688,223

IMPLEMENT MOUNTING FOR TRACTORS

Clarence R. Hagen and Paul J. Hulseberg, Memphis, Tenn., assignors to International Harvester Company, a corporation of New Jersey Application April 3, 1951, Serial No. 218,936

7 Claims. (Cl. 56—11)

1

This invention relates to harvesters and more particularly to a multiple row cotton harvester.

A general object of the invention is to devise a novel cotton harvester comprising several picker units disposed to obtain their proper approach to the plants and at the same time provide a substantially balanced structure.

More specifically, the invention contemplates a novel arrangement of picker units designed to harvest alternate rows of crops during each traverse of the field.

The invention also comprehends spacing the picker units far enough apart to provide easy accessibility thereto for repair or adjustment.

A different object is to obtain a design which will permit visual observation by the operator into the intake of each picker unit to insure proper entry of the plants therein and thereby prevent damaging or uprooting the plants.

Another object is to provide a machine which may be readily converted from a single row to a multiple row cotton harvester and wherein the addition to the single row machine is located at the right side of the tractor to facilitate highway transport.

A more specific object is to arrange one of the units to be carried by the rear axle structure intermediate the traction wheels of the tractor at one side thereof and to support the other or outboard unit from a novel framework carried by the rear axle structure outboardly of the opposite side of the tractor.

The invention contemplates the provision of a novel framework and connection thereof with the tractor, wherein the framework is journaled directly on an end of the axle of the traction wheels and extends outboardly thereof and inboardly over the wheel for connection to the rear axle housing.

The invention comprehends a unique design wherein the outboard picker unit is counterbalanced by a cotton receptacle supported from the tractor above its body.

A still further object is to provide means for guiding the plants in the rows between the picker units.

A yet further object is to design a machine utilizing interchangeable units.

The invention further comprehends a novel, compact and relatively inexpensive and strong frame construction which is simple to attach and disconnect from the tractor.

These and other objects of the invention will become more apparent from the specification and the drawings wherein:

2

Figure 3 is a top plan view of the harvester with parts removed to clarify the illustration.

Figure 5 is a fragmentary front view, with parts broken away and shown in section, of the tractor and the supporting framework for the outboard unit, and Figure 6 is a side elevational view of the structure shown in Figure 5 with the transverse beams in the foreground removed.

Figure 1:
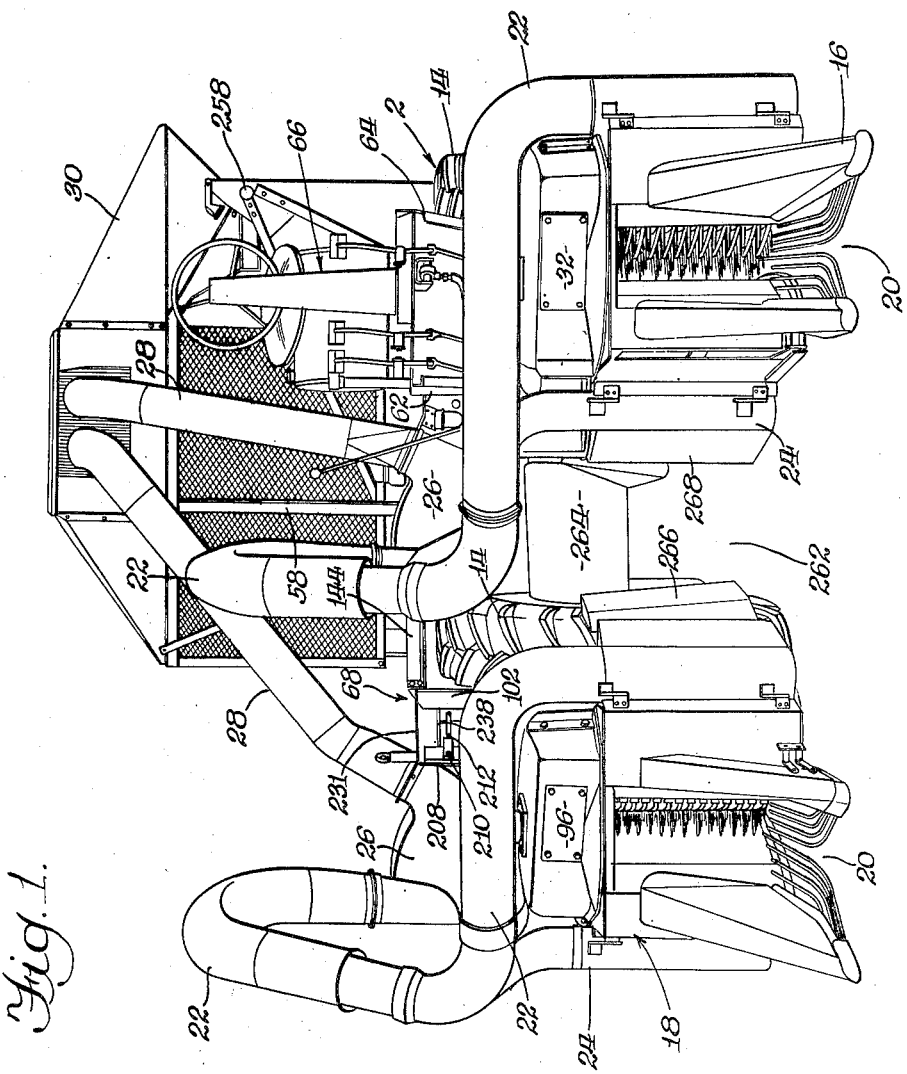
Figure 1 is a front perspective view of a two row cotton harvester incorporating the invention.

Describing the invention in detail, the harvesting mechanism is shown in connection with a conventional tractor, generally indicated 2, which is preferably of the tricycle type, having a narrow single wheel steering truck 4, a narrow longitudinally extending body 6 enclosing an engine and supported at one end on the steering truck, a transverse rear axle structure 8 connected to the opposite end of the body 6, the rear axle structure including a transverse rear housing 10 and axle means 12 extending from opposite ends thereof and traction wheels 14, 14 journaled thereon.

A pair of laterally spaced substantially identical agricultural harvesting units generally indicated 16 and 18, here cotton picking mechanisms, are disposed rearwardly of the rear axle structure 8 and are supported from the tractor as hereafter described. Each unit comprises harvesting means having a narrow throat or inlet 20 for receiving cotton plants to be picked. Conveying means in the form of ducts 22 and 24 extend from opposite sides of each unit 16 and 18, the duct 24 of each unit emptying into the duct 22 of the unit and the latter extending to a fan device 26 which provides suction for drawing cotton through the ducts 22 and 24 and pressure for forcing the cotton out through a duct 28 into a cotton receptacle or basket 30 supported above the tractor body 6. The units 16 and 18 are basically of the type shown in E. A. Johnston U. S. Patent 2,140,631 and the fan device 26 may be of the type shown in L. E. Nickla et al. U. S. Patent 2,389,533.

The unit 16 is positioned in a manner shown in A. W. Scarratt et al., United States Patent 2,352,291 and is disposed adjacent to the left traction wheel as viewed from the operator's station intermediate the wheels and comprises a head 32 secured to brackets 33, 33 which are pivotally connected on a horizontal axis as at 34, 34 to the outer ends of a pair of laterally spaced arms 36, 36 of a yoke generally indicated 38, the inner ends of the arms 36 being interconnected by a bar or shaft 40 supported on spaced brackets 44, 44, the brackets 44 being suitably connected as by bolts to a generally horizontal bottom web 46 (Fig. 6) of an L-shaped beam member 48 overlying the rear axle structure 8.

The beam member 48 forms the forward end of a supporting auxiliary frame generally indicated 50 for the unit 16 and the basket 30. The member 48 is connected adjacent to each end as by welding or rivets to the forward ends of a pair of laterally spaced U-section side beams 52 and 54 which extend longitudinally of the tractor between the traction wheels outwardly of the sides of the tractor body. The rear ends of the framework side beams 52 and 54 are connected to a transverse beam 56 which is connected to the front end of the body by braces 57, 57. The framework 50 affords a support for front and rear frames 58 and 60 which pivotally carry the basket above the tractor body in a manner similar to the shown in the before mentioned Scarratt et al. patent.

The beams 52 and 54 are connected adjacent to their forward ends by suitable brackets to the axle housing 10. The framework 50 is connected to gusset members 62 and 64 which support the operator's station generally indicated 66 and the mechanism inherent thereto.

The outboard cotton picker unit 18 is supported from a novel secondary or supplementary frame construction, generally indicated 68, which comprises a truss structure constituting transverse frame means 70 disposed outboardly of the right wheel 14 as viewed from the operator's station. The truss structure has a generally horizontal L-section top tension member 72 with a rear generally vertical web 74 merging at its lower edge with the forwardly extending bottom generally horizontal web 76 which mounts a bracket 78 adjacent each end, said brackets 78 providing journals on a generally horizontal axis for a rock shaft 80 which is connected adjacent to its ends to the rear extremities of forwardly extending arms 82 which with the shaft 80 form a supporting yoke or implement mounting means 83 for the unit 18.

The outer end of each arm 82 is pivoted by a pin 84 on a substantially horizontal axis to the upper end of an upright portion 86 of a bracket 88 which at the bottom extremity of portion 86 has a forwardly extending generally horizontal mounting web 90 (Fig. 4) provided with spaced slots 92, 92 elongated transversely of the tractor and receiving studs 94, 94 therethrough, the studs being connected to a head 96 of picker unit 18 and being secured to the associated bracket 88 by means of nuts 98, 98 clamping the associated web 90 against the head 96. It will be appreciated that the provision of the laterally elongated slots permits shifting of the unit 18 laterally or transversely to the line of draft to adjust for different spacing of the rows. The brackets 33 are connected in identical manner to unit 16 and have transversely elongated slots. In the present instance these slots are designed to permit adjustment for rows between thirty-eight and forty inches.

Figure 4:
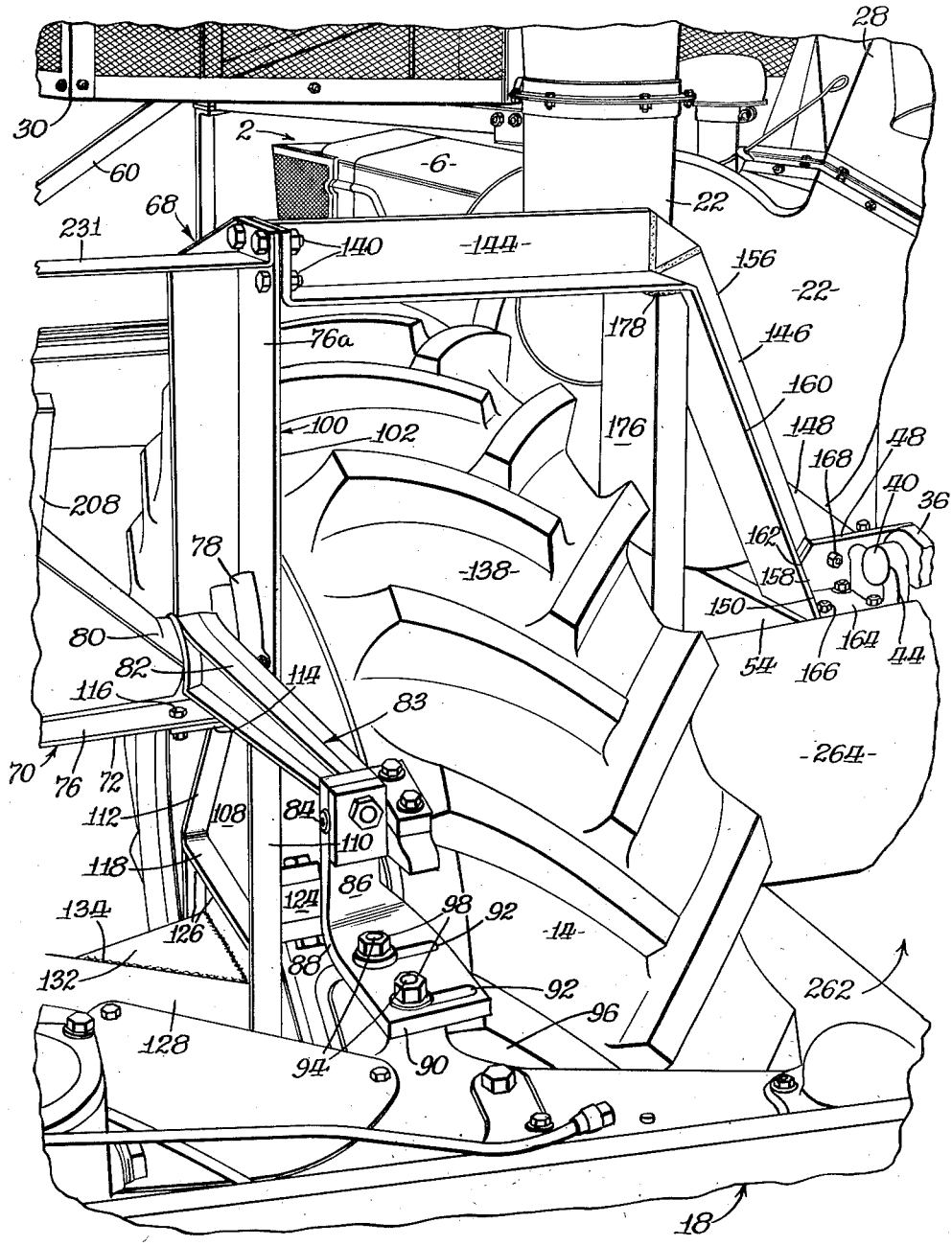
Figure 4 is a fragmentary perspective view on an enlarged scale of the framework supporting the outboard unit and looking downwardly from the right thereof and showing the row adjustment means.

The inboard end of the member 72 is secured to intermediate the ends of an upright strut or frame element generally indicated 100 (Fig. 5). In the present design, the strut 100 is formed in several sections, the upper of which, designated 102, is of L-section and formed as a continuation of the member 72 by appropriately bending the same upwardly and cutting out of web 74 at the included corner and joining it by welding at 104. The lower part 106 of the strut 100 is formed from a U-section piece which comprises a generally vertical web 108 positioned substantially coplanar with web 76a (continuation of web 76) of the upper part 102 of strut 100. The web 108 is provided at its lateral edges with outboardly extending flanges 110 and 112 as best seen in Fig. 4. The forward edge of web 108 extends substantially vertically and the rear edge diverges downwardly from the forward edge and then at its lower portion parallels the forward edge to provide a widened lower extremity. The upper edges of flanges 110 and 112 and web 108 are joined as by welding to a generally horizontal mounting plate 114 which is disposed beneath and connected as by bolts 116 to the web 76 of the tension member 72.

The lower section of the strut 100 is further strengthened intermediate its ends across the upper end of its widest extent by an integral generally horizontal outboard rib 118 and the lower edges of flanges 110 and 112 and web 108 are formed integral with an outboard substantially horizontal rib 122.

The strut 100 is provided on the inboard side of a load sustaining journal or bearing assembly 124 which is sleeved over the adjacent end of the axle 12, the bearing assembly being connected as by bolts 126, 126 to the inboard side of web 108 in the area thereof bounded between the ribs 118 and 122.

The outboard side of this area is connected to the lower end of a U-section compression member 128, the bottom edge of the member 128 resting on top of the rib 122 and seated on its forward side against the inner side of the flange 110. The connection between member 128 and strut 100 may be in the form of welding as at 130. The rear side of the member 128 at its inner end is further connected to the strut 100 by means of a substantially triangular gusset 132 which has its forward edge connected as by welding at 134 to the rear side of the member 128, the inner and rear edges of the gusset being welded to the outboard side of web 108 and the inner side of flange 112 respectively. The member 128 underlies the member 72 and serves as a compression unit to complete the truss structure 70. The member 128 extends diagonally upwardly outboardly and has its outer end bent substantially parallel to the bottom web 74 of member 78 and is connected thereto preferably as by bolts 136, 136.

The upper portion 102 of the strut 100 extends above the tire 138 of the adjacent wheel 14 and is connected as by bolts 140, 140 to a mounting plate 142 on the outboard end on a brace member 144 which passes over the tire 138. It will be seen that the member or portion 144 is of L-section and that the mounting plate 142 is preferably formed by suitably bending the rear web of the section. The strut portion 144 extends generally horizontally and terminates inboardly of the tire and wheel assembly 138, 14 and is then angled downwardly inboardly to provide a tension member 146 which at its lower end is connected by means of a gusset 148 and a mounting plate 150 to the upright and horizontal webs 152 and 46 respectively of member 48. This connection takes place at that end of member 48 which is adjacent to the truss structure 70. In the present instance, the gusset 148 is preferably welded to an upright web 156 of member 146 and the member 150 has a part 158 overlying web 160 of member 146 and is welded thereto as at 162, the lower end of part 158 being extended horizontally to form a mounting section 164 which overlies web 46. The plate 164 and web 154 are connected as by bolts 166 and the gusset 148 and web 152 are interconnected as by bolts 168.

Bolts 166 also connect to the forward end of beam member 54 which is connected on its bottom side by a gussett member 170 to a mounting plate 172 bolted to the axle housing 10. The extension member or mounting plate 172 is also connected at its outboard end to the housing as by a gusset 174 sleeved over axle 12.

The strut 144 is connected at its bottom side adjacent to its juncture with the tension member 146 to the upper end of a compression member 176 as by welding at 178. The member 176 is disposed outboardly of member 146 but inboardly of wheel and tire unit 138, and at its lower end is bent inwardly and connected as by bolts 180 to the top side of the member 172. Thus it will be seen that the unit 18 is supported from the axle 12 as well as the axle housing 10. The members 144, 146, 176 form a tension frame structure extending tractorward from the member 102.

The truss structure 70 is connected intermediate its ends to the forward end of a beam member 182 as by a bolt 184 which passes through the web 76 of member 72, beam member 182 being disposed adjacent to the inboard end of member 72 thereunder and being disposed outboardly of the adjacent wheel 138, 12 and extending generally parallel to the beam member 54 and at its rear end being connected to the adjacent end of the transverse beam 56 or framework 50. The beam 182 braces the truss structure longitudinally of the tractor.

The truss structure is further reinforced by an additional beam 186 which is disposed outboardly of beam 182, the beam 186 having a forward portion 188 extending generally parallel to the beam 182 and having its front end projecting between the members 72 and 128 adjacent to their outer ends and connected thereto as by bolt and bracket assemblies 188 and 190 respectively. The beam member 186 has a rear section 192 which is angled inwardly toward beam 182 and then at its rear end portion bent parallel to the member 182 and bolted thereto as at 194.

Figure 2:
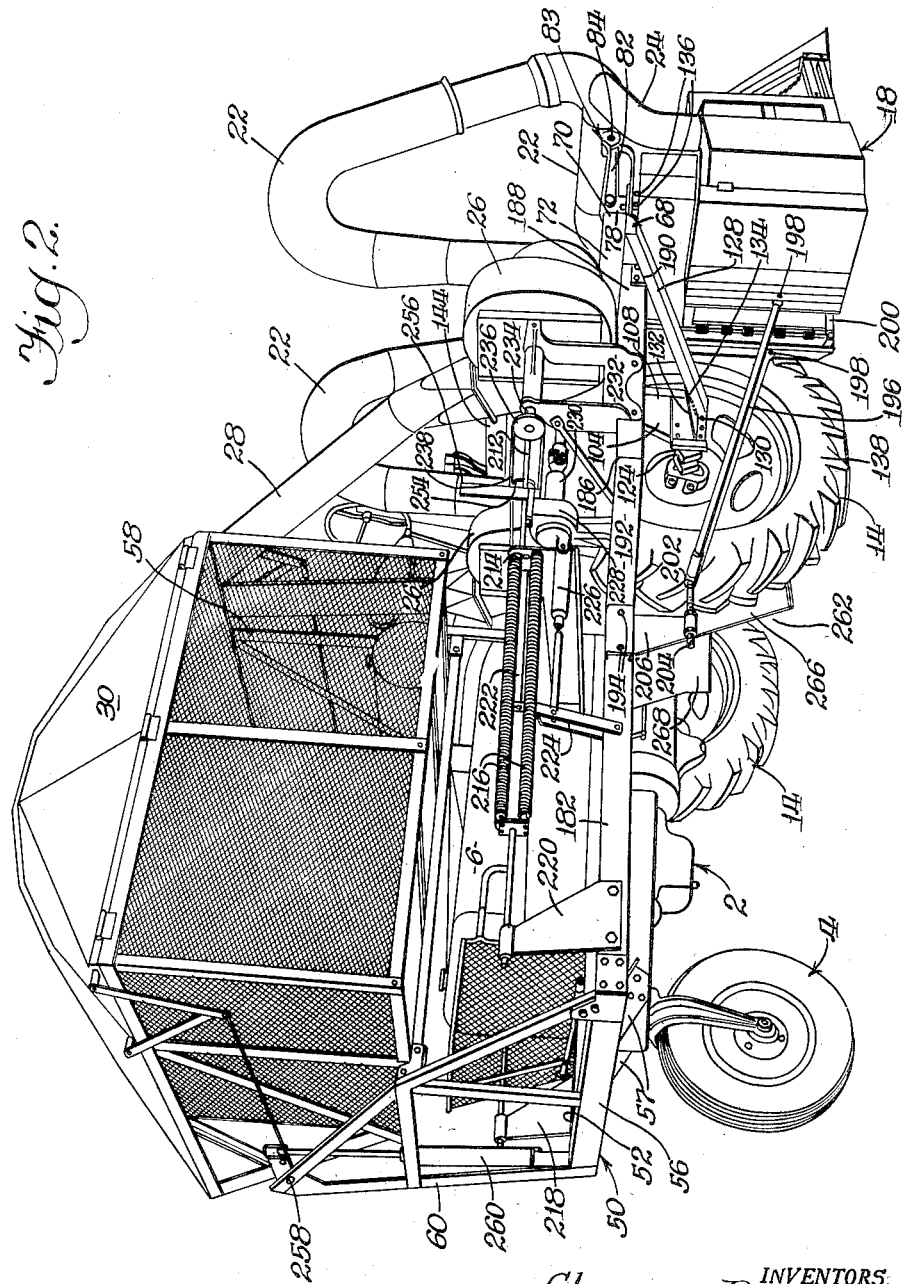
Figure 2 is a perspective view of the harvester looking directly towards the right rear corner thereof.

Each unit 16 and 18 is pivotally connected at its rear side to a stabilizer 196 (Fig. 2) which is a wishbone shaped element having a pair of forwardly extending arms pivoted as at 198, 198 to the unit at opposite sides of the plant exit 200 thereof. The rear end of the stabilizer for unit 18 is pivotally connected as at 202 to an eye bolt 204 adjustably connected to the lower end of a depending standard 206 which is fastened between beams 182 and 186 by the bolts 194 as shown in Figure 5. The stabilizer for unit 16 is not shown inasmuch as it is substantially identical to that illustrated in the before-mentioned Scarratt et al. patent.

The yoke and stabilizer for each unit are adjustable for 38 and 40 rows and form a parallelogram linkage connecting the unit to the associated supporting structure, and provide for vertical movement of the unit to transport and operating positions.

Each unit is lifted or lowered by means of a lever 208 which at its lower end is connected to the bar or shaft 40 or 80 of the related yoke 38 or 83. Each lever 208 is pivoted adjacent to its upper end as at 210 to the forward end of a link 212 which at its rear extremity is attached to a plate 214, the plate in turn being connected to the forward ends of counterbalancing tension springs 216, 216. The rear ends of springs 216 associated with unit 16 are connected to the upper end of a standard 218 which at its lower end is secured to beam 52 adjacent to the rear end thereof. The rear ends of springs 216 associated with unit 18 are connected to the upper end of a standard 220 which at its lower end is secured to beam 182 adjacent to the rear end thereof. Each plate 214 is connected by a strap 222 to the upper end of a lever assembly 224 which intermediate its ends is pivoted to a piston stem of a hydraulic motor which has a cylinder 226 connected to suitable support structure as illustrated. The cylinder 226 shown in Figure 2 connects to the outer end of a casing 228 mounted on beam 182. It will be realized that each unit 16 and 18 is movable independently of the other to permit adjustment for the specific condition in the associated row of crops.

The casing 228 extends inboardly and contains conventional drive means from the engine to the unit 18 through a propeller shaft 230, the unit 16 being driven as shown in the before mentioned patents.

The fan device 26 of unit 18 is fastened by a strap 231 to portion 102 of strut 100 and is mounted upon portion 168 of beam 186 by means of a stand-off member 232 which journals the driving shaft 234 which has a pulley 236 driven by a belt 238 trained on pulley 240 (Fig. 3) of shaft 242 of fan device 26 of unit 16. Shaft 242 is journaled in a standard 244 attached to beam 54 and has several other pulleys 246, 246 keyed thereto and driven by belts 248, 248 trained on pulleys 250, 250 which are driven by a power take-off shaft 252 of the tractor and which also drives the units 16 and 18.

The belt 238 may be properly tensioned by an idler pulley 254 adjustably mounted on a standard 256 connecting to casing 228.

It will be noted that the basket 30 is dumped to the left of the operator by pivoting at 258 under urging of hydraulic motor means 260 acting between the basket and the frame 50. The operation is the same as explained in the patents. This dumping to the left is counterbalanced effectively by the positioning of unit 18 which adds materially to the stability of the machine.

A guideway or passage 262 is provided between the units 16 and 18 for guiding an intermediate row of plants. A downwardly bowed roof plate 264 forms the top of the passage and is curved around the leading side and bottom of the axle housing 10 and secured thereto in any convenient manner.

Side plates 266 and 268 depend from the lateral ends of plate 264 plate 266 shielding the adjacent wheel 12 and extending in continuation of the inboard side of unit 18. The plate 268 extends as a continuation of the inboard side of unit 16. Plates 266 and 268 may be suitably secured to adjacent structure. The passage 262 is designed to protect the plants in the row intermediate those being processed by units 16 and 18 and is located to the right, as viewed from the operator's station, of the steering wheel of truck 4.

It will be noted that the location of the upwardly extending portion of duct 22 of unit 18 at the outboard side of unit 18 and the positioning of the operator's station in alignment with unit 16 immediately rearwardly thereof affords excellent visual observation for the operator of the plants entering both units 16 and 18. This has been actually established in practice.

The invention is especially applicable to current practice of planting cotton in four rows. The alternate row harvester on a first traverse of a field picks rows one and three and on the return pass processes rows two and four.

What is claimed is:

1. For use with a tractor having a longitudinal body and a transverse axle housing with axles projecting from its ends and wheels mounted thereon; a secondary frame for mounting upon the tractor comprising an upright frame element positionable along the outward side of a wheel and having a lower end with a load sustaining journal for mounting upon the axle outwardly of said wheel, and having an upper end extending above said wheel, a tractorward extending tension frame structure connected to said element to extend over said wheel inboardly thereof and having means for connection to said housing, transverse frame means disposed in a substantially upright plane and extending outboardly from said frame element and connected thereto, and implement mounting means carried by said frame means.

2. The invention defined by claim 1 further characterized in that: said transverse frame means includes an upper horizontal member having one end connected to said frame element intermediate its ends and extending outboardly therefrom and a diagonal member having one end connected to said lower end of said frame element and extending outboardly therefrom and having an opposite end connected to the opposite end of said horizontal member.

3. The invention defined by claim 1, further characterized in that: said tension frame structure comprises a tension beam assembly having a generally horizontal beam portion connected at one end to said frame element and extending tractorward to beyond the inboard side of said wheel, a diagonal beam portion connected at one end to the end of said horizontal portion remote from said element and extending diagonally downwardly therefrom and having connecting means at its opposite end for connection to said axle housing.

4. The invention according to claim 3 and further characterized in that: said tension frame structure comprises an upright compression member extending downwardly from said horizontal portion and having an upper end connected to said horizontal portion at said end thereof remote from said frame element and said compression member having a lower end including means for connection to said axle housing.

5. For use with a tractor having a longitudinal body and transverse axle means mounting ground-engaging support means: a secondary frame for mounting upon said tractor comprising an upright frame element positionable along the outward side of said support means and having a lower end with a load sustaining journal for mounting upon the axle outwardly of said support means, and projecting above said support means, a tractorward extending tension frame structure connected to said frame element and having a first portion disposed at a height to extend over said support means and second portion formed as a continuation of said first portion to extend downwardly along the inward side of said support means for connection to said body, transverse frame means extending outwardly from said frame element and comprising an upper tension member and a lower compression member having interconnected ends remote from said element and having ends adjacent to said element connected thereto at vertically spaced areas, and implement supporting means carried by said compression member.

6. For use with a tractor having a longitudinal body and a transverse rear axle housing with axles projecting from opposite ends and wheels mounted thereupon: a secondary frame for mounting upon said tractor comprising an upright frame element positionable along the outward side of a wheel and having a lower end with load sustaining journal for mounting upon the adjacent axle outwardly of said wheel, said element projecting to a height to have its upper end above said wheel, a tractorward extending tension frame connected at one end to the upper end of said element and having a first portion extending inwardly therefrom for a distance in excess of the width of said wheel and a second portion extending downwardly from the first to connect with said housing, said element and said portions of said tension frame defining a wheel-accommodating inverted-U arch, an implement supporting transverse frame structure extending outwardly from said frame element and connected thereto, and a diagonal beam member connected to and extending generally horizontally from one side of said transverse frame structure to said tractor body for connection thereto, and means for connecting said beam member to said body.

7. For use with a tractor having a body and a supporting wheel and axle assembly: an implement support comprising a frame disposed in an upright plane and positionable to extend transversely of the tractor in extension of said wheel and axle assembly, a load sustaining journal on the end of said frame adjacent to said assembly and disposed at one side of said plane for mounting upon the axle of said assembly, and means extending transversely to said plane and connected to said frame and positionable alongside said body, and means for connecting said last-mentioned means to said body.

References Cited in the file of this patent

UNITED STATES PATENTS

| Number | Name | Date |
|---|---|---|
| 1,879,823 | Ray | Sept. 27, 1932 |
| 2,023,491 | Rust et al. | Dec. 10, 1935 |
| 2,082,053 | Freudenberg | June 1, 1937 |
| 2,172,987 | Mott | Sept. 12, 1939 |
| 2,214,818 | Johnston | Sept. 17, 1940 |
| 2,352,291 | Scarratt et al. | June 27, 1944 |
| 2,413,873 | Hume | Jan. 7, 1947 |
| 2,616,353 | Thomann | Nov. 4, 1952 |